Oct. 6, 1936.   J. A. BRIGGS   2,056,247
TELEVISION APPARATUS
Filed Jan. 16, 1932
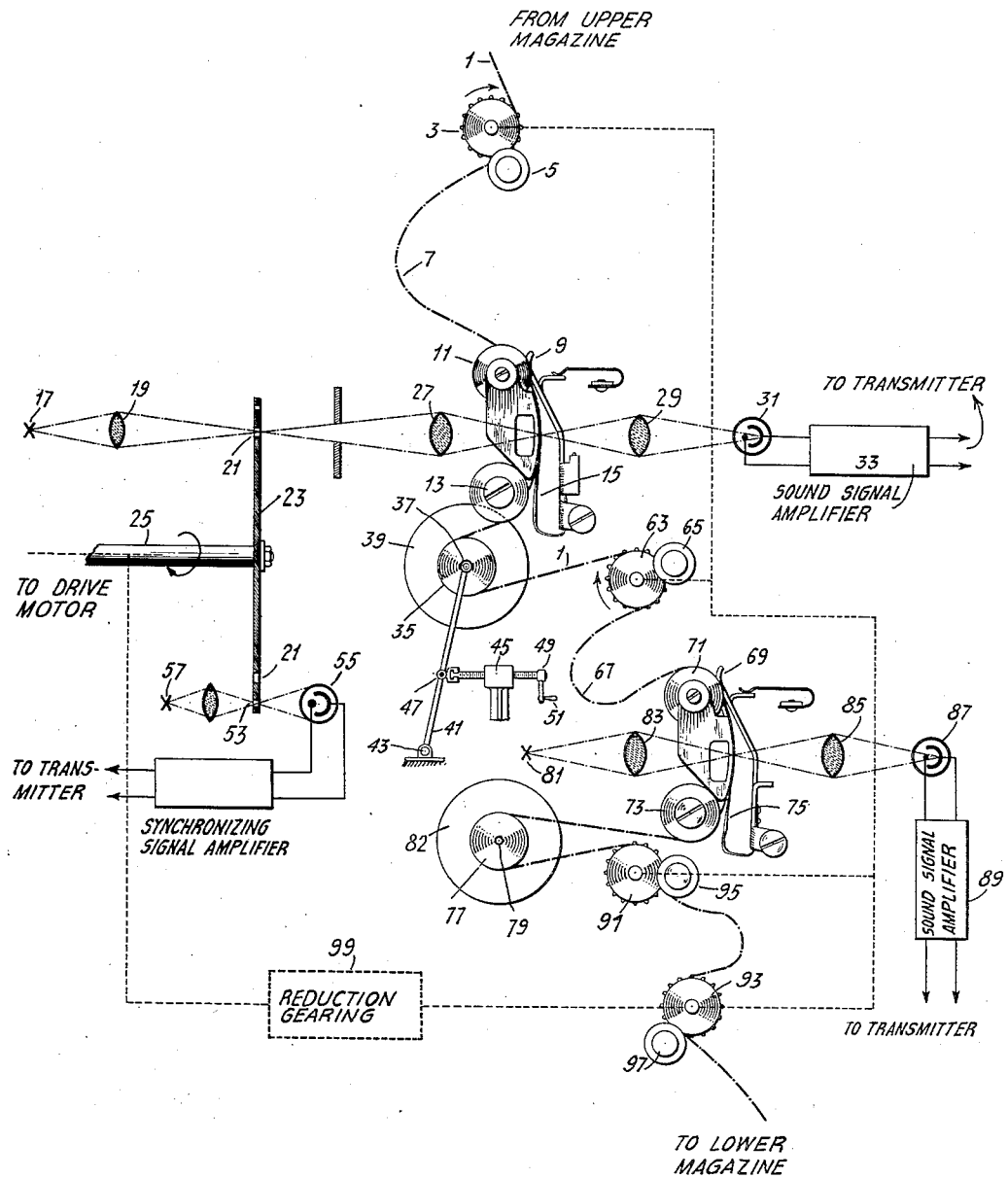
INVENTOR
J. A. BRIGGS
BY
H. G. Grover
ATTORNEY Patented Oct. 6, 1936

2,056,247

UNITED STATES PATENT OFFICE 2,056,247

TELEVISION APPARATUS

Joseph A. Briggs, Erlton, N. J., assignor to Radio Corporation of America, a corporation of Delaware Application January 16, 1932, Serial No. 587,005

2 Claims. (Cl. 178—6)

The present invention relates to scanning systems, and particularly to scanning systems for television transmission of motion picture film with or without sound accompaniment.

More particularly, the invention is directed to a method and apparatus whereby the film, an electro-optical image of which is to be reproduced at the point of reception, shall at all times be moved through the film transmitting device at a constant and uniform speed in order that the transmission may be accomplished with the utmost simplicity.

It has already been proposed heretofore to utilize systems for transmission of motion picture film or the like wherein the film is moved through the transmitting apparatus intermittently in a manner somewhat similar to the usual type of motion picture projection apparatus, and then, during the period when the film is stationary relative to the point of scanning, suitable provision is made for analyzing the picture portion of each film frame by means of an appropriately arranged scanning element. Such a scanning element may consist, for example, of a disk, or the equivalent, having arranged about its periphery a series of apertures or lens elements positioned along a spiral path. This spiral arrangement of apertures or lenses, however, cannot extend throughout the entire circumference of the scanning element because provision must be made for advancing the motion picture film relative to the analyzing or scanning element after a complete scanning of each picture frame so that a new section or frame of the film is presented before the scanning apparatus. Consequently, it has been customary up to the present time when using intermittent types of film scanning devices to omit the scanning apertures for an area included within a sector occupying a space of between 45 to 90 degrees of the area of the entire scanning disk.

Such systems, of course, necessitate a waste of approximately twelve to twenty-five percent of the time available for scanning, and consequently to transmit a picture of any good detail the width of transmission band for the scanning is correspondingly increased over that which would be necessary were it possible to utilize substantially one hundred percent of the available time for transmission of intelligence less the time required to send a synchronizing impulse for horizontal and vertical framing.

Therefore, it has been found more satisfactory to transmit the picture portion of a motion picture film by apparatus which scans the film while it is moved continuously, and it is to this type of apparatus to which this disclosure is principally directed. Such apparatus may consist, for example, of a rotary scanning element provided with apertures, lenses, or the equivalent, which traverse during the rotary motion of the scanning element successive adjacent strips or sections of the film frame. In transmitting in this manner the scanning apertures, lenses, or the like, on the scanning element are preferably all arranged on equal radii so that the film as it moves continuously relative to the point of scanning is always presenting a new or previously unscanned area or elemental strip before the analyzing or scanning element.

In order that an indication of the time of completion of scanning each elemental section or strip of the film, as well as an indication of the time of completion of scanning the entire film frame may be transmitted to the point where an electro-optical image of the scanned film is to be produced, it is desirable that a synchronizing signal impulse follow, or precede, if desirable, the signal indications representative of the varying intensities of light and shadow on successive elemental areas of each elemental strip of the film scanned as well as the entire series of signals representative of the sum of the signals for the entire number of elemental strips into which each film frame section is assumed to be divided. Such a synchronizing signal may be produced by the scanning element itself through the use of a separate path of scanning elements or apertures arranged concentrically with the film scanning elements. To provide for these synchronizing signals to follow or precede each scanned elemental strip of the film, as well as the signals representative of a complete picture frame, it has been suggested to transmit at the end of each scanning of an elemental strip a signal of predetermined amplitude and of negligible time duration following the picture signals for each elemental strip, and then to transmit at the end of the entire series of signals representative of the picture impulses for an entire picture frame a synchronizing signal which may be either of the same amplitude as the signal for indicating the completion of the scanning of each elemental strip but of substantially longer duration, or a signal of substantially the same time duration but of substantially increased amplitude. By reason of these two different types of signals, it is possible to make a selection at the point of reception between the signals which indicate the horizontal framing and the vertical framing by providing suitable selecting arrangements to distinguish the two types of synchronizing signals one from the other either by virtue of the difference in time duration or by virtue of the difference in amplitudes.

The present invention is not concerned particularly with the synchronizing signals which are to follow the scanning of each elemental strip of the film frame but is directed principally to ways and means by which provision may be made to care for framing the synchronizing signal which should follow immediately after an entire film frame has been scanned. Such a signal may be what is termed a vertical framing signal, assuming the film is scanned in elemental strips or sections transverse to the film. This signal may be generated by the scanning element, and to assume a case where the vertical signaling impulse is of substantially the same amplitude as the horizontal framing signal impulse, it may be regarded that the vertical framing signal will be of a time duration equal approximately to the time of scanning or analyzing one or two elemental strips of the motion picture film. Thus, the vertical framing signal will appear in the unusable portion of the picture film for intelligence transmission which is customarily occupied by the frame line separating successive picture areas of the film.

Consequently, it can be seen that with the scanning element adapted to scan for the purpose of analyzing the varying intensities of light and shadow on the picture portion of the film, and also arranged to provide a means by which the horizontal and the vertical framing signals are generated, there is but one point where the scanning element must be positioned at any definite time to transmit a signal to indicate the completion of scanning a complete picture frame or, in other words, to indicate the vertical framing of the reproduced picture.

It is necessary, in order that this vertical framing signal may be transmitted in proper time relationship with the scanning of the film, to adjust or frame the film in its passage through the film gate where it is analyzed as to the intensity of light and shadow on elemental areas thereof so that the film is in proper relationship or position with respect to the scanning disk position at any particular instant. Furthermore, it is also necessary to add the effect of additional mass to the film so that when it is once in frame it will continue to move at an event rate through the film gate during the scanning operation and remain in proper frame so that the relative position of the film at any instant to the scanning disk will be maintained.

Therefore, as one of the primary objects of this invention I have sought to provide a method and apparatus by which it is possible to use a single element only to provide increased mass for the film and, at the same time, to use this same element to provide for the framing adjustment of the film necessary to procure the desired time relationship between the scanning operation and the time at which an indication of the completion of scanning each individual frame of the motion picture film is transmitted. To accomplish this result I have provided what I have termed an adjustable impedance roller arranged immediately adjacent, and preferably below, the film gate for scanning and as closely adjacent to the gate as is mechanically possible. By moving this impedance roller in an arcuate manner, for example, it is possible to adjust or move the film in its frame position relative to the film gate to provide for the conditions above set forth.

Provision is also made for analyzing the sound record portion of the film as it is passed through the sound pick-up portion of the system. In this case also it is desirable to provide for the same constant motion of the film relative to the sound pick-up or analyzing device so that the sound record may be analyzed at a perfectly uniform rate in order that the sound record may be coordinated and associated with the picture subjects. This result is accomplished also by means of an impedance roller, although this roller need not be adjustable.

Other objects of my invention are to provide structure which is free from complicated and intricate parts, a structure which is relatively cheap to manufacture and install, and, at the same time, to provide a structure by which a picture framing adjustment can be made during periods of operation, if necessary, with a minimum amount of inconvenience.

Other objects and advantages of the arrangement will, of course, suggest themselves at once to those skilled in the art to which the invention is directed by reading the following specification and claims in connection with the accompanying drawing, wherein the single figure thereof illustrates in diagrammatic manner a preferred form which my invention may assume.

Referring now to the drawing, the film I which is to be televised is led from the upper magazine or storage reel (not shown) through the usual drive sprocket wheel 3 against which bears a pressure roller 5. After being withdrawn from the upper magazine by rotation of the sprocket wheel 3, a loop 7 is formed in the film in order that the film, as it is to be passed through the film gate 9, may not be torn should there be any unevenness in the motion of the film. As the film enters the film gate, it is passed over the usual upper guide roll 11 and leaves the film gate by passing over the lower guide roller 13. Along the edge of the film gate the usual pressure bar 15 bears against the edge of the film and holds the film securely within the gate.

The film is scanned along successive elemental strips while it passes through the film gate 9, this scanning action being accomplished by illuminating the film in the film gate with the light issuing from a light source 17 as directed by a condensing lens 19 so as to pass through the apertures 21 on the scanning disk element 23 which is rotating at constant speed on a shaft 25, for example, at speed of 1440 R. P. M. corresponding to a scannning speed of twenty-four picture frames per second.

After the light has passed through the apertures 21 on the disk, it is then directed by means of a cylindrical lens 27, or the equivalent, to illuminate the film in the film gate, and the light transmitted through the film, varying, of course, in accordance with the transparency of the film at each particular elemental section to represent the varying intensities of light and shadow on these elemental areas, is focused by a lens element 29 to a spot upon a light translating element in the form of a photoelectric tube 31. It is preferable to focus the light issuing from the film to a particular point upon the light sensitive layer within the photoelectric tube so that variations in response, due to the possibility of uneven distribution of the photoelectric material on the cathode of the photoelectric tube, may not produce varying output levels.

The fluctuating light values influencing the photoelectric tube 31 are converted into proportionately varying electric current impulses which may then be amplified in any suitable manner by means of the picture signal amplifier 33 from which these impulses are directed to a transmitter and transmitted by wire or radio to the receiving points in any well-known manner.

So as to draw the film 1 through the film gate 9 at a uniform rate and, at the same time, so as to provide for framing in a vertical direction, for example, the film is arranged to pass, after leaving the lower guide roller 13 of the film gate, over an impedance roller 35 which is carried upon a spindle 37 and arranged to be rigidly mounted thereon. The impedance roller 35 is preferably a smooth pulley which is friction driven by the film and has supported upon the spindle carrying the impedance roller a fly-wheel 39, so that as the impedance roller rotates, due to the film motion and friction drive, the fly-wheel also rotates and tends to smooth out speed variations and thus overcome any irregularities in the film motion due, for example, to variations in the sprocket holes. Thus, provision is made for passing the film through the film gate at practically constant velocity.

Now, in order to provide for vertical framing of the picture by manually adjusting the film in the film gate with respect to synchronizing apertures in the disk arranged to influence a photoelectric tube for producing a synchronizing impulse in a manner to be hereinafter disclosed, to indicate the completion of scanning one film frame, and to provide an arrangement so that this synchronizing impulse, which is to influence the receiving end of the system, is generated at just the time when the scanning of a complete picture frame is accomplished, the impedance roller 35 carried by the spindle 37, which is mounted, for example, in a projecting arm 41 secured for pivotal movement to a frame at 43, may be adjusted by tuning a threaded spindle 45, attached at a point 47 on the pivotal arm 41, mounted within a fixed bearing member 49 in either a clockwise or counter-clockwise manner.

It has already been explained in copending application of A. W. Vance, filed June 17, 1931, Serial No. 544,959, that the scanning disk element is provided with scanning apertures such as the apertures 21, each arranged on equal radii for scanning the picture portion of a subject, and also it has been explained that a second series of apertures 53 arranged concentrically with the scanning apertures 21 may be provided on the disk and all arranged at equal radii. By providing a diaphragm 55 having a rectangular opening therein of a shape substantially the same as the picture portion of each film frame, provision can be made by making the vertical width of the diaphragm equal to the frame width minus the frame line width to provide a lapse in the time of energization of the photoelectric tube 31 by the picture impulses equal to the time period required for the frame line to pass the point of analyzing.

During this period of blackness when the photoelectric tube 31 is uninfluenced by picture impulses, a second photoelectric tube 55 can be illuminated from a source 57, for example, through the second set of apertures 59 on the scanning element with light of constant intensity. This steady light value produces a steady current flow through the second photoelectric tube 51 which can be suitably combined, after amplification in the synchronizing signal amplifier 61, with the output of the photoelectric tube 31 in order to produce a signal for framing to follow a series of signals indicating a complete picture. In order that this signal may be selected from the picture signals at the receiving point with the least difficulty possible, it is desirable that it be shifted relative to the output of the tube 31 by a phase shift of 180 degrees, as explained in the aforesaid application of A. W. Vance.

This phase shift may be produced for example by providing a single stage of amplification of the current impulses generated by the photoelectric tube 51, whereas two stages of amplification of the signals generated in the photoelectric tube 31 for picture signals is provided. This has the effect of making the signal pulses from the synchronizing signal amplifier 61, when combined with the signals of the picture signal amplifier 33, appear as a "black" signal. This produces a desirable result because at the point of reception, assuming that a grid controlled cathode ray tube is used to reconstruct the electrode-optical image, it is possible to supply the synchronizing signal to the image reproduced along with the picture signal and cause an interruption in the produced luminous effect during periods when synchronization or framing takes place.

After the film 1 has passed over the impedance roller 35, it is threaded around another driving sprocket 63 against which bears a pressure roller 65. The film is then formed into a loop 67 and passed through the sound film gate 69 over the upper guide roller 71 and through the film gate to the lower guide roller 73. The pressure member 75 of the film gate 69 guides the edge of the film as it passes through the film gate. After the film has been drawn through the film gate 69, it is passed over an impedance roller 77, which is mounted upon a spindle or shaft 79 to which is attached a fly-wheel 82. The impedance roller 77 is of a friction driven type similar to the impedance roller 35, except that no adjustment for framing need be provided, the purpose of the lower impedance roller used in connection with the sound film gate being merely that of providing for uniformity of the motion of the film through the sound film gate 69.

As the film is passing through the sound gate, it is illuminated along the edge portion thereof on which the sound track appears by a light source 81 directing the issuing light by means of a lens 83, so as to focus upon the edge portion of the film. In accordance with either the variations in the width of blackness of successive elemental sections of the sound track or in accordance with the variations in density of the same size elemental sections, light of a variable quantity determined by either of these two features passes through the film and is directed by means of a lens element 85 to focus upon a light translating element such as the photoelectric tube 87, from which it is passed to the sound signal amplifier 89 and thence to the transmitter, so that the sound signal which accompanies the picture action appearing on successive picture frames of the motion picture film may be transmitted to accompany the picture signal.

In order to move and control the direction of motion of the film passing beyond the impedance roller 77, the usual driving sprockets 91 and 93 provided with the pressure rollers 95 and 97, respectively, are provided. The film, after passing the last drive sprocket 93, is wound upon a storage reel (not shown) in the lower magazine.

All of the driving sprockets 3, 63, 91 and 93, respectively, are driven at the same constant speed and all are coordinated with the driving motor used to rotate the shaft 25 upon which the scanning element 23 is supported. In order that the speed of rotation of the film drive sprockets may be proportionate to the speed of rotation of the scanning element 23, it may be desirable to provide a series of reduction gears which connect with the drive motor shaft. To indicate the fact that all film drive sprockets are driven at the same constant speed and all driven from the drive motor for the scanning element, these various parts have been shown as connected by dotted line indications.

Thus, with a fixed and constant relationship existing between the speed of rotation of the film drive sprockets and the speed of rotation of the disk member, it can be seen that small fluctuations in the speed of rotation of the single drive motor will not have the effect of producing distortion in the transmission of the picture signals corresponding to the varying intensities of light and shadow representative of the pictures on successive film frames, and thus there is a strict cooperation between the movement of all rotary parts.

While the invention has herein been explained in one of its preferred embodiments, it is, of course, obvious that many changes may be made therein without departing from the spirit and scope thereof as has been defined in the hereinafter appended claims, and therefore I believe myself to be entitled to make and use all of these modifications such as would be apparent to anyone skilled in the art to which the invention is directed.

Having now described my invention, what I claim and desire to secure by Letters Patent is the following:

1. In a television system wherein the message transmission is produced from a motion picture film having a sound record thereon, means for feeding the film continuously at a predetermined rate past a scanning point, means for analyzing the varying intensities of light and shadow of the picture portion of the several elemental areas of the film at said scanning point for producing television signals, means for feeding the film at the same predetermined rate past a sound take-off point, and means including a mechanical impedance for adjusting the length of film between the two said points whereby the said picture and sound record may be properly synchronized.

2. In a television system wherein the message transmission is produced from a motion picture film having a sound record accompaniment thereon, means for scanning the picture portion of the film for producing television signals therefrom, means for feeding the film continuously at a predetermined rate past the point of analyzing, means for analyzing the sound record portion of the film, means for feeding the film at the same rate past the sound analyzing point, and means for adjusting the length of film between the two said points whereby the said picture and sound record may be properly synchronized, said means comprising a movable idler cooperating with a bight of said film and having a flywheel integral therewith.

JOSEPH A. BRIGGS.